(12) United States Patent
Cai (10) Patent No.: US 9,494,085 B2
(45) Date of Patent: Nov. 15, 2016

(54) SYSTEM AND METHOD FOR LOAD POWER MANAGEMENT IN A TURBOSHAFT GAS TURBINE ENGINE

(71) Applicant: UNITED TECHNOLOGIES CORPORATION, Farmington, CT (US)

(72) Inventor: Chaohong Cai, Westogue, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/599,937

(22) Filed: Jan. 19, 2015

(65) Prior Publication Data

US 2016/0208717 A1    Jul. 21, 2016

(51) Int. Cl.
*G06F 19/00* (2011.01)
*F02C 9/00* (2006.01)
*B64D 35/00* (2006.01)
*F02C 9/54* (2006.01)

(52) U.S. Cl.
CPC ........................................ *F02C 9/54* (2013.01)

(58) Field of Classification Search
USPC ................................ 701/100; 60/773; 244/60
See application file for complete search history.

(56) References Cited

U.S. PATENT DOCUMENTS

| | | | |
|---|---|---|---|
| 4,018,044 A | 4/1977 | Joby et al. | |
| 4,276,744 A | 7/1981 | Pisano | |
| 6,422,023 B1* | 7/2002 | Dudd, Jr. ................. | F02C 7/26 60/773 |
| 6,773,368 B1* | 8/2004 | Williames ............... | B60K 17/16 475/74 |
| 2003/0015873 A1* | 1/2003 | Khalizadeh ............... | H02P 9/04 290/7 |
| 2004/0093130 A1* | 5/2004 | Osder ..................... | B64C 27/18 701/3 |
| 2005/0067527 A1* | 3/2005 | Petersen .................. | B64C 27/10 244/17.11 |
| 2009/0224096 A1* | 9/2009 | Waide .................. | B64C 29/0033 244/60 |
| 2010/0003886 A1* | 1/2010 | Cheng ..................... | A63H 27/12 446/37 |
| 2014/0229036 A1* | 8/2014 | Vallart .................... | B64C 27/12 701/3 |
| 2015/0113996 A1* | 4/2015 | Cai ............................ | F02C 9/54 60/773 |

FOREIGN PATENT DOCUMENTS

| | | |
|---|---|---|
| EP | 0053547 A1 | 6/1982 |
| EP | 0398839 A2 | 11/1990 |
| EP | 1568606 A2 | 8/2005 |

OTHER PUBLICATIONS

EP SR for International Application No. 16151976.4. Issued Jun. 16, 2016. (9 pgs).

* cited by examiner

*Primary Examiner* — Thomas G Black
*Assistant Examiner* — Tyler Paige
(74) *Attorney, Agent, or Firm* — Cantor Colburn LLP (57) ABSTRACT

A control system for a gas turbine engine including a power turbine is disclosed. The control system may also include an outer loop control module to determine a torque request. The outer loop control module may include a feedback control component operative to provide regulation of the power turbine, a feed-forward component operative to anticipate a load on the power turbine, and a hybrid control component operative to prevent output of a torque request that cannot currently be delivered by the power turbine. The control system may also include an inner loop control module to receive the torque request from the outer loop control module, to determine fuel flow and inlet guide vane schedules based at least in part on the received torque request, and to send signals to control a gas generator of the gas turbine engine according to the determined fuel flow and inlet guide vane schedules.

20 Claims, 6 Drawing Sheets

SYSTEM AND METHOD FOR LOAD POWER MANAGEMENT IN A TURBOSHAFT GAS TURBINE ENGINE

TECHNICAL FIELD OF THE DISCLOSURE

The present disclosure is directed generally toward gas turbine engines, and more specifically toward a control system and method for a gas turbine engine.

BACKGROUND OF THE DISCLOSURE

Gas turbine engines typically include a compressor section, a combustor, and a turbine section, arranged in flow series with an upstream inlet and a downstream exhaust. Initially, air flows through the compressor section where it is compressed or pressurized. The combustor then mixes and ignites the compressed air with fuel, generating hot combustion gases. These hot combustion gases are then directed from the combustor to the turbine section where power is extracted from the hot gases by causing blades of the turbine to rotate.

Gas turbine engines may include one or more spools. For example, small-scale engines may generally use a one-spool design with co-rotating compressor and turbine sections, while larger-scale engines may generally comprise a number of coaxially nested spools. The multiple spools may operate at different pressures, temperatures, spool speeds, and directions. For instance, two-spool designs may include a high pressure spool (or high spool) and a low pressure spool (or low spool). The high pressure spool may include a high pressure turbine driving a high pressure compressor, and the low pressure spool may include a low pressure turbine driving a low pressure compressor.

Turboshaft engines, a type of gas turbine engine typically used on helicopters, generally include a third power turbine spool. The power turbine spool may comprise a power turbine that drives an external load, such as a main rotor of the helicopter. Helicopter flight maneuvers, which involve a change in collective pitch, rapidly change the load or power demand on the power turbine. However, in order to achieve ideal handling qualities for the airframe, a constant rotor speed should ideally be maintained when delivering the requested change in power demand on the power turbine. Accordingly, there exists a need for an engine control system that matches the change in power demand while maintaining a constant rotor speed.

SUMMARY OF THE DISCLOSURE

In one embodiment, a control system for a gas turbine engine including a power turbine is disclosed, the control system comprising: an outer loop control module configured to output a current power turbine torque request (Qpt_req), the outer loop control module comprising: a feedback control component configured to provide regulation of the power turbine; a feed-forward component configured to anticipate a load on the power turbine; and a hybrid control component configured to cause the feedback control component to switch to a decay dynamic if a previously determined power turbine torque request (Qpt_req) deviates more than a predetermined amount from a currently delivered torque of the power turbine; and an inner loop control module configured to receive the current power turbine torque request (Qpt_req) from the outer loop control module, to determine fuel flow and inlet guide vane schedules based at least in part on the received current power turbine torque request (Qpt_req), and to send signals to a gas generator of the gas turbine engine in order to control the gas generator according to the determined fuel flow and inlet guide vane schedules.

In a further embodiment of the above, the outer loop control module determines the current power turbine torque request (Qpt_req) based at least in part on a real-time collective lever angle command.

In a further embodiment of any of the above, the load is produced by a rotor coupled to the power turbine.

In a further embodiment of any of the above, the feed-forward component includes predetermined rotor load maps for an airframe containing the power turbine and the rotor.

In a further embodiment of any of the above, the feedback control component comprises a Proportional Integral control component.

In a further embodiment of any of the above, the Proportional Integral control component includes an integrator operative to produce an integral control signal (U_int).

In a further embodiment of any of the above, the hybrid control component is configured to cause the integrator to switch to the decay dynamic if the previously determined power turbine torque request (Qpt_req) deviates more than a predetermined amount from the currently delivered torque of the power turbine.

In a further embodiment of any of the above, the hybrid control component receives the integral control signal (U_int), a power turbine torque error signal (Qpt_error) comprising the previously determined power turbine torque request (Qpt_req) minus one of a measured or estimated value of the currently delivered torque of the power turbine, and a power turbine speed error signal (NP_error) comprising a desired power turbine speed minus a measured speed of the power turbine, wherein the hybrid control component is configured to cause the integrator to converge to zero if either of the following conditions are present during a period of time: (A) U_int is greater than zero and either: 1) the previously determined Qpt_req is greater than a predetermined maximum limit; or 2) NP_error is greater than a first predetermined positive threshold value and Qpt_error is greater than a second predetermined positive threshold value. (B) U_int is less than zero and either: 1) the previously determined Qpt_req is less than a predetermined minimum limit; or 2) NP_error is less than a first predetermined negative threshold value and Qpt_error is less than a second predetermined negative threshold value.

In a further embodiment of any of the above, the control system further comprises a load estimation module configured to communicate with the outer loop control module, the inner loop control module, and the gas turbine engine, the load estimation module configured to generate signals indicative of a real-time estimated power turbine speed and a real-time estimated power turbine torque.

In a further embodiment of any of the above, the inner loop control module determines the fuel flow and inlet guide vane schedules based at least in part on a real-time estimated power turbine speed.

In another embodiment, a turboshaft engine is disclosed, comprising: a gas generator section; a power turbine section downstream of the gas generator section; and a control system in communication with the gas generator section and the power turbine section, the control system comprising: an outer loop control module configured to output a current power turbine torque request (Qpt_req), the outer loop control module comprising: a feedback control component configured to provide regulation of the power turbine; a feed-forward component configured to anticipate a load on the power turbine; and a hybrid control component configured to cause the feedback control component to switch to a decay dynamic if a previously determined power turbine torque request (Qpt_req) deviates more than a predetermined amount from a currently delivered torque of the power turbine; and an inner loop control module configured to receive the current power turbine torque request (Qpt_req) from the outer loop control module, to determine fuel flow and inlet guide vane schedules based at least in part on the received current power turbine torque request (Qpt_req), and to send signals to a gas generator of the gas turbine engine in order to control the gas generator according to the determined fuel flow and inlet guide vane schedules.

In a further embodiment of any of the above, the outer loop control module determines the current power turbine torque request (Qpt_req) based at least in part on a real-time collective lever angle command.

In a further embodiment of any of the above, the load is produced by a rotor coupled to the power turbine.

In a further embodiment of any of the above, the feedforward component includes predetermined rotor load maps for an airframe containing the power turbine and the rotor.

In a further embodiment of any of the above, the feedback control component comprises a Proportional Integral control component.

In a further embodiment of any of the above, the Proportional Integral control component includes an integrator operative to produce an integral control signal (U_int).

In a further embodiment of any of the above, the hybrid control component is configured to cause the integrator to switch to the decay dynamic if the previously determined power turbine torque request (Qpt_req) deviates more than a predetermined amount from the currently delivered torque of the power turbine.

In a further embodiment of any of the above, the hybrid control component receives the integral control signal (U_int), a power turbine torque error signal (Qpt_error) comprising the previously determined power turbine torque request (Qpt_req) minus one of a measured or estimated value of the currently delivered torque of the power turbine, and a power turbine speed error signal (NP_error) comprising a desired power turbine speed minus a measured speed of the power turbine, wherein the hybrid control component is configured to cause the integrator to converge to zero if either of the following conditions are present during a period of time: (A) U_int is greater than zero and either: 1) the previously determined Qpt_req is greater than a predetermined maximum limit; or 2) NP_error is greater than a first predetermined positive threshold value and Qpt_error is greater than a second predetermined positive threshold value. (B) U_int is less than zero and either: 1) the previously determined Qpt_req is less than a predetermined minimum limit; or 2) NP_error is less than a first predetermined negative threshold value and Qpt_error is less than a second predetermined negative threshold value.

In a further embodiment of any of the above, the control system further comprises a load estimation module configured to communicate with the outer loop control module, the inner loop control module, and the gas turbine engine, the load estimation module configured to generate signals indicative of a real-time estimated power turbine speed and a real-time estimated power turbine torque.

In a further embodiment of any of the above, the inner loop control module determines the fuel flow and inlet guide vane schedules based at least in part on a real-time estimated power turbine speed.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
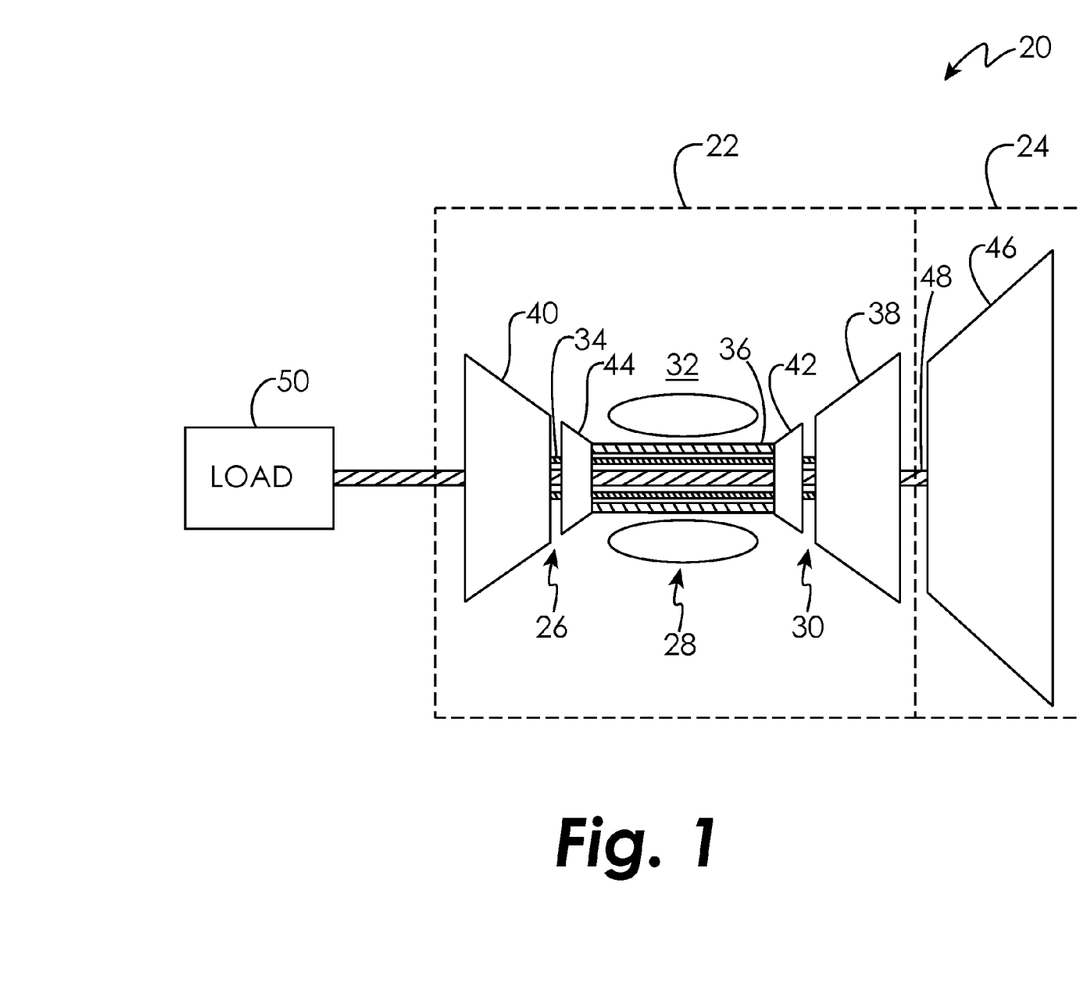
FIG. 1 is a schematic representation of a gas turbine engine, according to one embodiment.

Referring now to the drawings, and with specific reference to FIG. 1, in accordance with the teachings of the disclosure, an exemplary gas turbine engine 20 is shown. In this example, the gas turbine engine 20 is a turboshaft engine, although other types of gas turbine engines are certainly applicable to this disclosure. The gas turbine engine 20 may be used on an aircraft for generating thrust or power, on a rotorcraft for generating output shaft power, or in land-based operations for generating power as well.

The gas turbine engine 20 may generally comprise a gas generator section 22 and a power turbine section 24. The gas generator section 22 may include a compressor section 26 where air is pressurized, a combustor 28 downstream of the compressor section which mixes and ignites the compressed air with fuel and thereby generates hot combustion gases, a turbine section 30 downstream of the combustor 28 for extracting power from the hot combustion gases, and an annular flow path 32 extending axially through each.

The gas generator section 22 may comprise a single-spool configuration or a two-spool configuration. In this example, the gas generator section 22 comprises a two-spool configuration, particularly, a low spool 34 and a high spool 36. Mounted to the low spool 34 is a low pressure turbine 38 which drives a low pressure compressor 40. Mounted to the high spool 36 is a high pressure turbine 42 which drives a high pressure compressor 44. More or less than two spools may certainly be used in the gas generator section 22. The power turbine section 24 of the gas turbine engine 20 comprises a power turbine 46 mounted to a power turbine spool 48. The gas generator section 22 generates combustion gas that imparts torque to the power turbine spool 48 through the power turbine 46. The power turbine spool 48 may drive a load 50, such as, without limitation, a rotor, a turbo-pump, an electrical generator, a propeller, or other load. Although not shown, a gear box may multiply the torque or power from the power turbine spool 48 to the load 50.

Referring now to FIGS. 2-5, with continued reference to FIG. 1, a control system 60 for the gas turbine engine 20 is shown, according to an embodiment. The control system 60 may comprise digital and/or analog elements. In an embodiment, the control system 60 may comprise a non-transitory computer readable storage medium having stored thereon computer-executable instructions, such as, at least one computer processor. As shown best in FIG. 2, the control system 60 may include an outer loop control module 62 in communication with an inner loop control module 64. The outer and inner loop control modules 62, 64 are also in communication with the gas turbine engine 20 and load 50 (e.g., control units and/or sensors of the gas turbine engine 20 and load 50). For example, the control system 60 may include a plurality of sensors operatively connected to the computer processor. The plurality of sensors may be disposed on the gas turbine engine 20 and load 50, generating signals indicative of operating parameters, such as, without limitation, a real-time power turbine speed and a real-time estimated power turbine torque.

Figure 2:
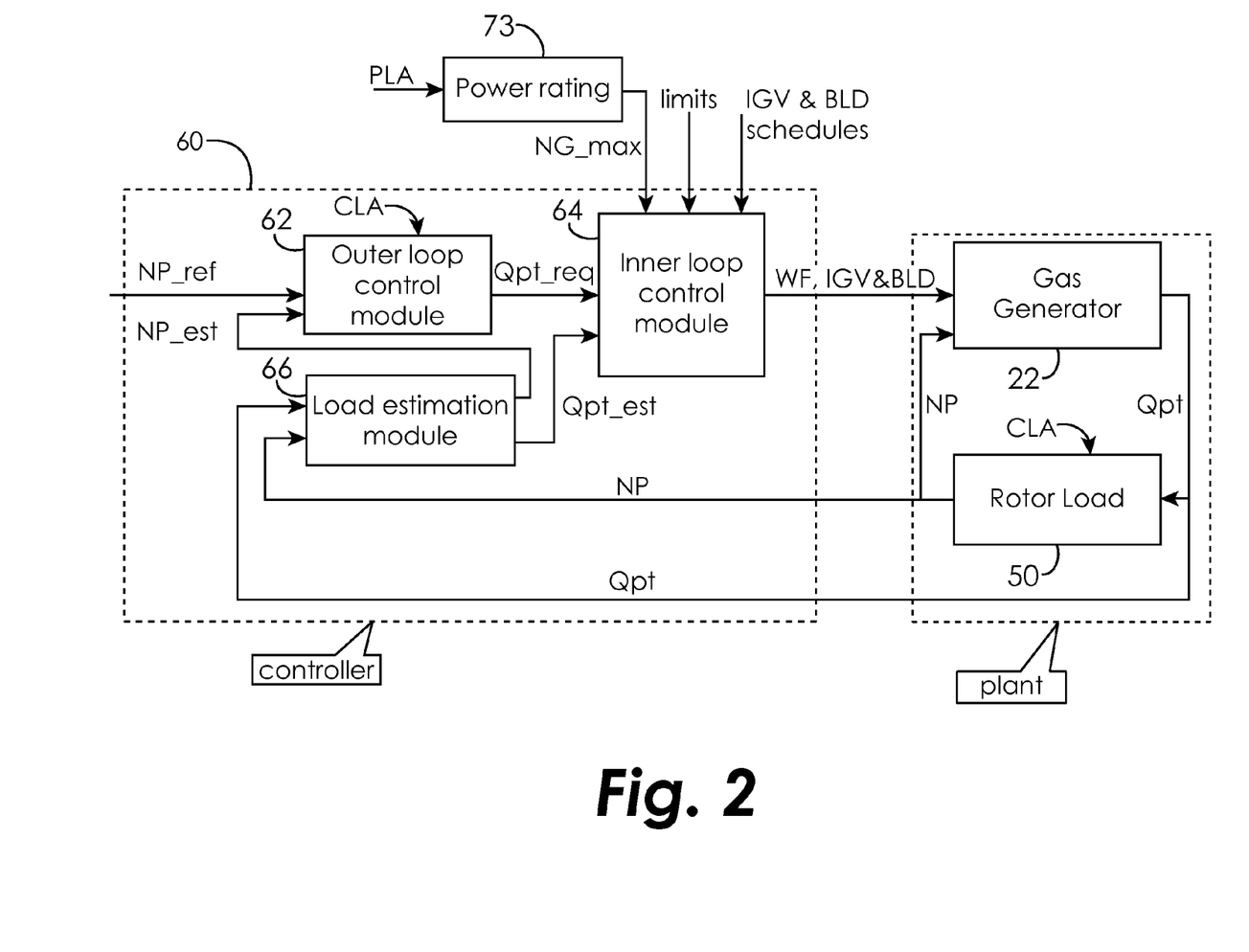
FIG. 2 is a schematic representation of a control system for the gas turbine engine of FIG. 1.

The outer loop control module 62 and the inner loop control module 64 create a cascaded architecture of the control system 60 in order to manage power demand of the gas turbine engine 20 and rotor speed of the load 50. The outer loop control module 62 may be in communication with the load 50, and the inner loop control module 64 may be in communication with the gas generator section 22 of the gas turbine engine 20. In this example, the load 50 is a combination of the power turbine and main rotor of the helicopter, although other loads are certainly possible. The gas generator section 22 and the load 50 may also be in communication with each other. In addition, a load estimation module 66 may be in communication with the outer loop control module 62, inner loop control module 64, gas generator section 22, and load 50.

The outer loop control module 62 may receive a signal from the load estimation module 66 indicative of an estimated power turbine speed (NP_est) in real-time. In addition, the outer loop control module 62 may receive a desired power turbine operation speed (NP_ref) signal and a signal indicative of a collective lever angle command (CLA), that is, collective pitch command, in real-time. Based at least in part on the received signals, the outer loop control module 62 determines a torque request (Qpt_req) of the power turbine that will match the estimated power turbine speed (NP_est) in real-time to the desired power turbine speed (NP_ref) by control regulation. In so doing, the outer loop control module 62 may maintain the power turbine 46 at a same rotor speed, or power turbine speed. The ratio between rotor speed and power turbine speed may be constant and may be determined by the gear ratio of the gear box coupling the rotor to the power turbine spool. A signal indicative of the determined torque request (Qpt_req) is then sent from the outer loop control module 62 to the inner loop control module 64.

Figure 3:
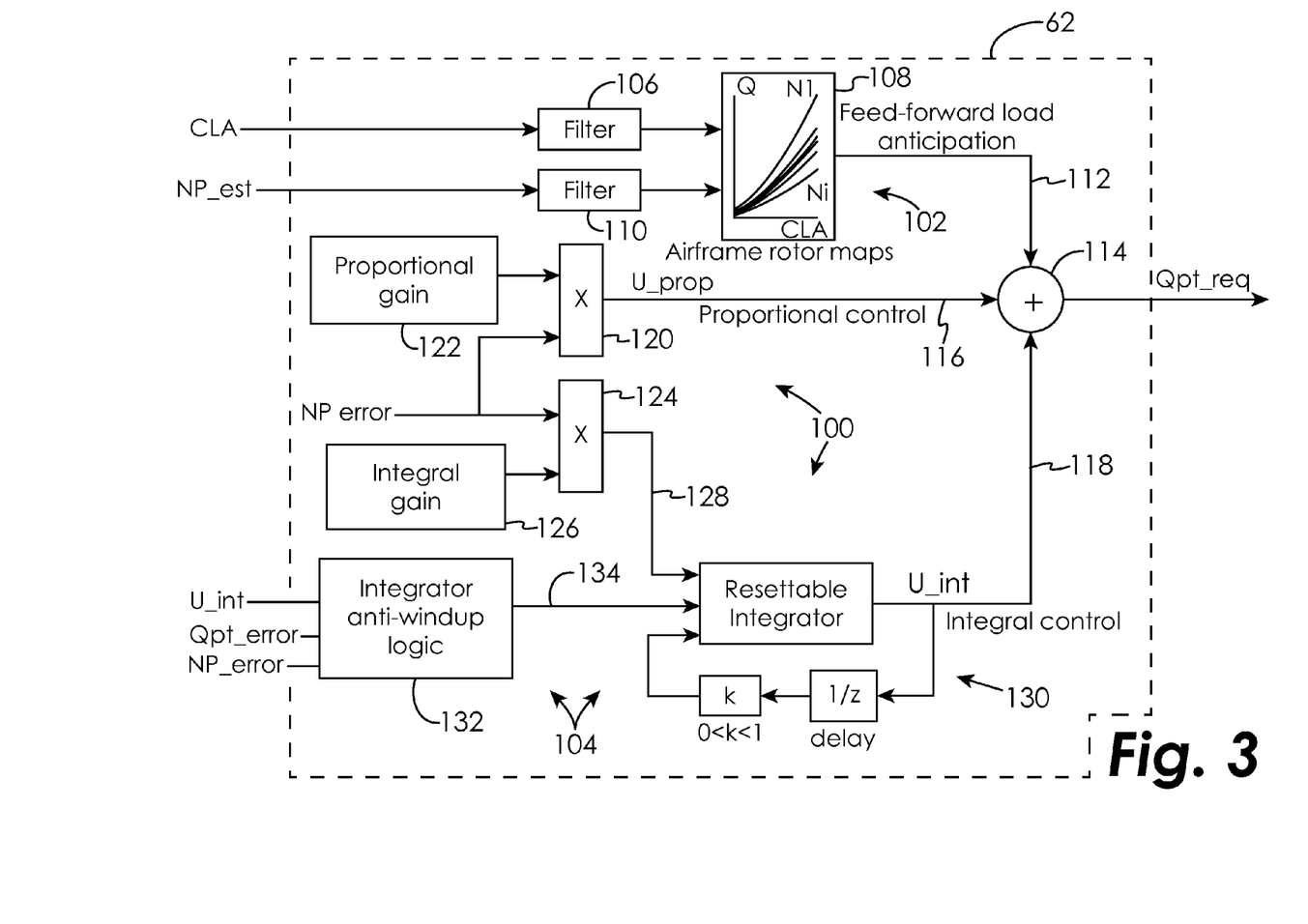
FIG. 3 is a schematic representation of an outer loop control module for the control system of FIG. 2.

In order to generate the torque request, the outer loop control module 62 employs a hybrid control model. For example, as shown in FIG. 3, the outer loop control module 62 may include a feedback control component 100 for power turbine spool regulation, a feed-forward component 102 for rotor load anticipation, and a hybrid control component 104 for preventing the integrator from winding up when the inner loop control module 64 is engaged with certain engine 20 operation limits (such as speed acceleration of the gas generator 22 spools, temperature, pressure or torque limits, to name just a few non-limiting examples). In an embodiment, the feedback control component 100 may comprise a Proportional Integral control, the feed-forward component 102 may comprise a component using predetermined rotor load maps for the airframe containing the gas generator 22 and the load 50, and the hybrid control component 104 may comprise a component that switches between power turbine spool regulation error integration and regulation of integrator decay dynamics, as described in greater detail hereinbelow. It is to be understood that the predetermined load maps may apply to loads other than the rotor, such as, without limitation, a turbo-pump, an electrical generator, a propeller, or the like.

The collective lever angle command signal (CLA) is optionally filtered by filter 106 and applied as an input to the predetermined rotor load maps 108 for the airframe containing the gas generator 22 and the load 50. The estimated power turbine speed (NP_est) signal is optionally filtered by filter 110 and applied as an input to the predetermined rotor load maps 108. The output of the predetermined rotor load maps 108 is a feed-forward load anticipation signal 112 that is applied to summation block 114.

The outer loop control module 62 further includes a feedback control component 100 operative to output a proportional control signal (U_prop) 116 and an integral control signal (U_int) 118, both of which are applied to summation block 114. The outer loop control module 62 may compare the desired power turbine speed signal (NP_ref) to the actual power turbine speed signal (NP) in order to determine a difference between the two signals, or a power turbine speed error signal (NP_error)=(NP_ref)−(NP). The power turbine speed error signal (NP_error) is applied to a multiplier 120. Also applied to the multiplier 120 is a predetermined proportional gain constant 122, such that the proportional control signal (U_prop) 116 comprises the power turbine speed error signal (NP_error) multiplied by the predetermined proportional gain constant 122. The proportional control signal (U_prop) 116 is therefore a value that is proportional to the current power turbine speed error value. The feedback control component 100 may also comprise a Lead-Lag compensator, which may work together with the Proportional Integral control or a similar control algorithm (for example, Proportional Integral plus Derivative control), for improving control performance, to name just a few non-limiting examples.

The power turbine speed error signal (NP_error) is also applied to a multiplier 124. Also applied to the multiplier 124 is a predetermined integral gain constant 126, such that the output 128 of multiplier 124 comprises the power turbine speed error signal (NP_error) multiplied by the predetermined integral gain constant 126. The output 128 is applied as an input to a resettable integrator 130. The resettable integrator 130 also receives a (reset) logic signal 134 from the integrator anti-windup logic module 132 and determines whether or not to reset the resettable integrator 130 value, as discussed in greater detail hereinbelow. The resettable integrator 130 determines the sum of the instantaneous power turbine speed error signal (NP_error) over time, multiplied by the predetermined integral gain 126, and represents the accumulated power turbine speed error (NP_error) that should have been corrected previously. This sum is the integral control signal (U_int) 118. The integral control signal (U_int) 118 is proportional to both the magnitude of the error and the duration of the error.

In the case of a large change in the desired power turbine speed (NP_ref), the resettable integrator 130 can accumulate an error larger than the maximal value for the desired power turbine torque request (Qpt_req). This is known as windup, and causes the outer loop control module 62 to overshoot the desired power turbine torque request (Qpt_req). In order to prevent windup of the resettable integrator 130, the outer loop control module 62 may include integrator anti-windup logic module 132. An output 134 of the integrator anti-windup logic module 132 is a logic signal and is applied to a reset input of the resettable integrator 130. A predetermined value of the output 134 of the integrator anti-windup logic module 132 will cause the resettable integrator 130 to switch to reset (e.g., switch to a decay dynamic and converge to zero). For example, if the logic signal 134 is true, then resettable integrator 130 value may be reset as the last resettable integrator 130 value multiplied by a positive ratio that is smaller than one (1), which consequently makes the resettable integrator 130 value gradually decrease to zero as long as the logic signal 134 is true over a period of time. On the other hand, if the logic signal 134 is false, then the resettable integrator 130 may choose to use the output 128 as the input for integration and proceed with the normal integration function.

The integrator anti-windup logic module 132 receives as inputs the integral control signal (U_int) 118, a power turbine torque error signal (Qpt_error) comprising a previously determined power turbine torque (Qpt_req) minus the measured power turbine torque (Qpt) or the estimated power turbine torque (Qpt_est), and the power turbine speed error signal (NP_error). The power turbine torque error signal (Qpt_error) may also be defined as a filtered Qpt_req (i.e., the value of the previously determined Qpt_req after passing through a first-order lag filter) minus the measured power turbine torque (Qpt) in an embodiment. In an embodiment, the integrator anti-windup logic module 132 may command the resettable integrator 130 to reset if either of the following conditions are present:

(A) U_int>0
  and either:
  1) the previously determined Qpt_req>a predetermined maximum limit; or
  2) NP_error>a first predetermined positive threshold value and Qpt_error>a second predetermined positive threshold value.
(B) U_int<0
  and either:
  1) the previously determined Qpt_req<a predetermined minimum limit; or
  2) NP_error<a first predetermined negative threshold value and Qpt_error<a second predetermined negative threshold value.

The integrator anti-windup logic module 132 may also command the resettable integrator 130 to reset under other operational conditions during which the outer loop control module 62 desires to turn off the integral control portion of the Proportional Integral control, such as during ignition or shut-down modes, to name just two non-limiting examples.

The integrator anti-windup logic module 132 will therefore work properly for both normal load operations (power turbine spool regulation) and transient operations when the gas generator 22 is engaged with certain engine operation limits. During the transient operations, if the integrator anti-windup logic module 132 detects an engine status in which there is a relatively large gap between the engine torque feedback (Qpt) or the estimated power turbine torque (Qpt_est) and the power turbine torque request (Qpt_req), then the integrator 130 is switched to a decay dynamic and, in some embodiments, converges to zero. The integrator 130 functions normally as long as the gap between the engine torque feedback (Qpt) and the power turbine torque request (Qpt_req) is relatively small. In other embodiments, the aforementioned reset-trigger conditions may be modified slightly for improving overall control system performance; for example, the conditions (A) and (B) may be re-derived by comparing U_int to a nonzero value, to name just one non-limiting example.

The feed-forward load anticipation signal 112, the proportional control signal (U_prop) 116, and the integral control signal (U_int) 118 are summed by summation block 114. An output of the summation block 114 comprises the desired power turbine torque signal (Qpt_req).

Referring back to FIG. 2, the inner loop control module 64 receives the power turbine torque request signal (Qpt_req) from the outer loop control module 62. In addition, the inner loop control module 64 may receive a signal indicative of an estimated power turbine torque (Qpt_est) in real-time from the load estimation module 66. The inner loop control module 64 matches the power turbine torque request signal (Qpt_req) and the estimated power turbine torque (Qpt_est) signal in real-time by determining at least one of a fuel flow (WF), inlet guide vane (IGV) schedules, and stability bleed (BLD) schedules. Other inputs, such as, signals indicative of gas generator speed maximum limit (NG_max), gas turbine engine limits, and inlet guide vane (IGV) and stability bleed (BLD) schedules in real-time may also be received by the inner loop control module 64.

The gas generator speed maximum limit (NG_max) signal may be sent to the inner loop control module 64 from a power rating module 73. Power rating module 73 receives a power lever angle signal (PLA) to generate gas generator speed maximum limit (NG_max) signal. Since gas generator speed is a function of power lever angle, power rating module 73 may utilize tables to generate the gas generator speed maximum limit (NG_max) signal based on the power lever angle (PLA) command.

As used herein, the term "inlet guide vane schedules" may refer to the positioning of the low compressor stator vanes and the high compressor stator vanes. The term "stability bleed schedules", as used herein, may refer to the positioning of the bleed valves between the compressors. Both the inlet guide vane angles and the stability bleed valves may be scheduled or adjusted as a function of corrected compressor speed in a way to manage compressor stability margin.

Based at least in part on the received signals, the inner loop control module 64 determines a fuel flow (WF), inlet guide vane (IGV) schedules, and stability bleed (BLD) schedules of the gas generator section 22 that will deliver the power turbine torque request (Qpt_req) generated by the outer loop control module 62. In so doing, the inner loop control module 62 manages multi-variable controls of the gas generator section 22 to quickly respond to power demand changes. A fuel flow signal (WF) indicative of the determined fuel flow, an inlet guide vane signal (IGV) indicative of the determined inlet guide vane schedules, and a stability bleed signal (BLD) indicative of the determined stability bleed schedules are sent from the inner loop control module 64 to the gas generator section 22 of the gas turbine engine 20. The fuel flow, inlet guide vane positions, and stability bleed valves of the gas generator section 22 are then adjusted according to the signals received from the inner loop control module 64.

Figure 4:
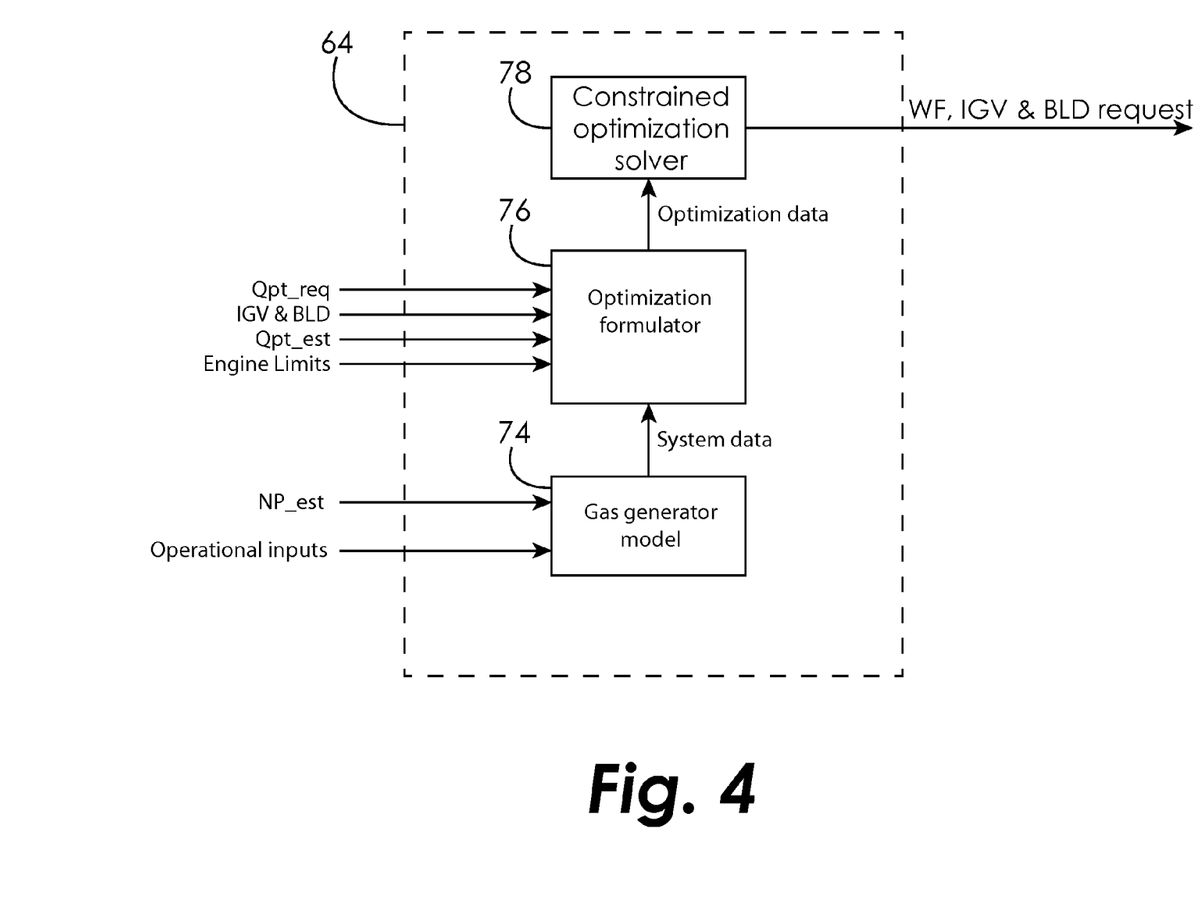
FIG. 4 is a schematic representation of an inner loop control module for the control system of FIG. 2.

In order to generate the fuel flow (WF), inlet guide vane schedules (IGV), and stability bleed schedules (BLD), the inner loop control module 64 employs a dynamical inversion approach. For example, as shown in FIG. 4, the inner loop control module 64 may include a gas generator model 74, an optimization formulator 76, and a constrained optimization solver 78. The gas generator model 74 may describe dynamic behavior of the gas generator. The gas generator model 74 may be a linear or nonlinear (e.g., differential algebraic equations, possibly in numerical simulation form), physics and data-based model based at least in part on the estimated power turbine speed (NP_est) and operational inputs. The operational inputs may include, but not be limited to an altitude of the airframe (ambient pressure over standard day pressure) and a corrected speed of the rotor spool.

Optimization formulator 76 may collect real-time data to formulate an optimization cost function (in part based on an error between a desired goal and the current state of a variable), and to formulate optimization constraints (in part based on an operational boundary of a variable in real physics). To do so, the optimization formulator 76 may use the power turbine torque request (Qpt_req) and the estimated power turbine torque signal (Qpt_est) to determine a cost function of the power turbine torque goal. The optimization formulator 76 may also use the IGV and BLD schedules together with the system data from the gas-generator model 74 to determine a cost function of the actuation goal. The optimization formulator 76 may further use the system data from the gas-generator model 74 together with the engine limits of the gas turbine engine 20, such as, without limitation, a rotor speed limit, a compressor stall limit, a lean blowout limit, a temperature limit, a pressure limit, or the like, as the optimization constraint data in formulating an optimization problem. Based on those inputs, optimization formulator 76 may formulate an optimization problem for which optimization software will be able to solve as a numerically iterative process in real-time. Constrained optimization solver 78 may receive optimization data from the optimization formulator 76 in order to generate the requested fuel flow, inlet guide vane schedules, and stability bleed schedules (WF, IGV & BLD request). Constrained optimization solver 78 may be a numerical iteration tool which finds a solution to the optimization problem formulated by optimization formulator 76. Real-time implementation of the inner loop control module 64 generates command values for fuel flow, inlet guide vane schedules, and stability bleed schedules that deliver a torque of the power turbine section 24 that is proximate or equal to the torque request (Qpt_req) and within the limits of the gas turbine engine 20.

Figure 5:
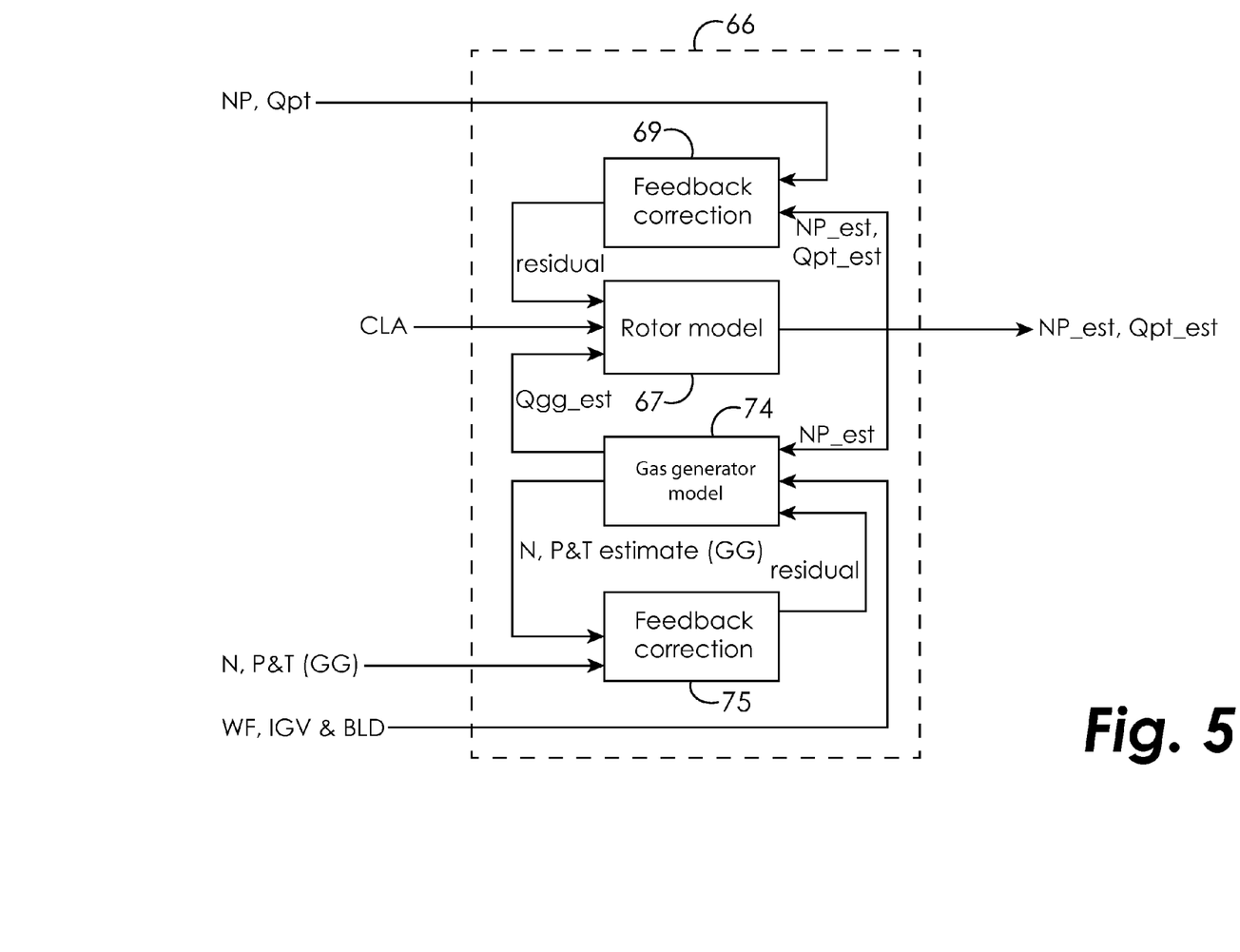
FIG. 5 is a schematic representation of a load estimation module for the control system of FIG. 2.

Referring now to FIG. 5, the load estimation module 66 may generate the estimated power turbine speed signal (NP_est) and the estimated power turbine torque signal (Qpt_est) by combining real-time speed sensor and torque sensor measurements (NP, Qpt) with dynamic model estimation. More specifically, the load estimation module 66 may include a rotor model 67 and feedback correction module 69. The rotor model 67 may be a linear or nonlinear (e.g., differential algebraic equations, possibly in numerical simulation form), physics and data-based rotor model based at least in part on the estimated power turbine speed (NP_est) and collective lever angle command (CLA). In addition, the rotor model 67 may be based on other inputs, such as operational inputs or environmental conditions including airframe speed, power turbine speed percentage, collective lever angle percentage, and autorotation mode (e.g., autorotation and autorotation recovery). The rotor model 67 may send the estimated speed and torque signals (NP_est, Qpt_est) to the feedback correction module 69.

The feedback correction module 69 may compare the speed sensor signal (NP) to the estimated speed signal (NP_est) from the rotor model 67 in order to determine a difference between the two signals (residual). The feedback correction module 69 may also compare the torque sensor signal (Qpt) to the estimated torque signal (Qpt_est) from the rotor model 67 in order to determine a difference between the two signals (residual). The difference between the signals from the sensor measurements and the estimated signals (residual) is then sent to the rotor model 67 in order to dynamically update the rotor model 67 for real-time implementation. Furthermore, the signal processing of real-time speed sensor and torque sensor measurements (NP, Qpt) may include sensor fault detection, isolation and accommodation (FDIA) techniques.

The load estimation module 66 may also include the gas generator model 74 and a feedback correction module 75. The gas generator model 74 receives the estimated power turbine speed (NP_est), as well as the fuel flow (WF), the inlet guide vane (IGV), and the stability bleed (BLD) signals. The gas generator model 74 may send the estimated gas generator speed, pressure and temperature signals (N, P and T estimate (GG)) to the feedback correction module 69 and the inner loop control module 64.

The feedback correction module 75 also receives the sensed gas generator speed, pressure and temperature signals (N, P and T). The feedback correction module 75 may compare the sensed gas generator speed, pressure and temperature signals (N, P and T) to the estimated gas generator speed, pressure and temperature signals (estimated N, P and T) from the gas generator model 74 in order to determine a difference between the signals (residual). The difference between the signals from the sensor measurements and the estimated signals (residual) is then sent to the gas generator model 74 in order to dynamically update the gas generator model 74 for real-time implementation. Furthermore, the signal processing of real-time sensed gas generator speed, pressure and temperature signals (N, P and T) may include sensor fault detection, isolation and accommodation (FDIA) techniques.

Figure 6:
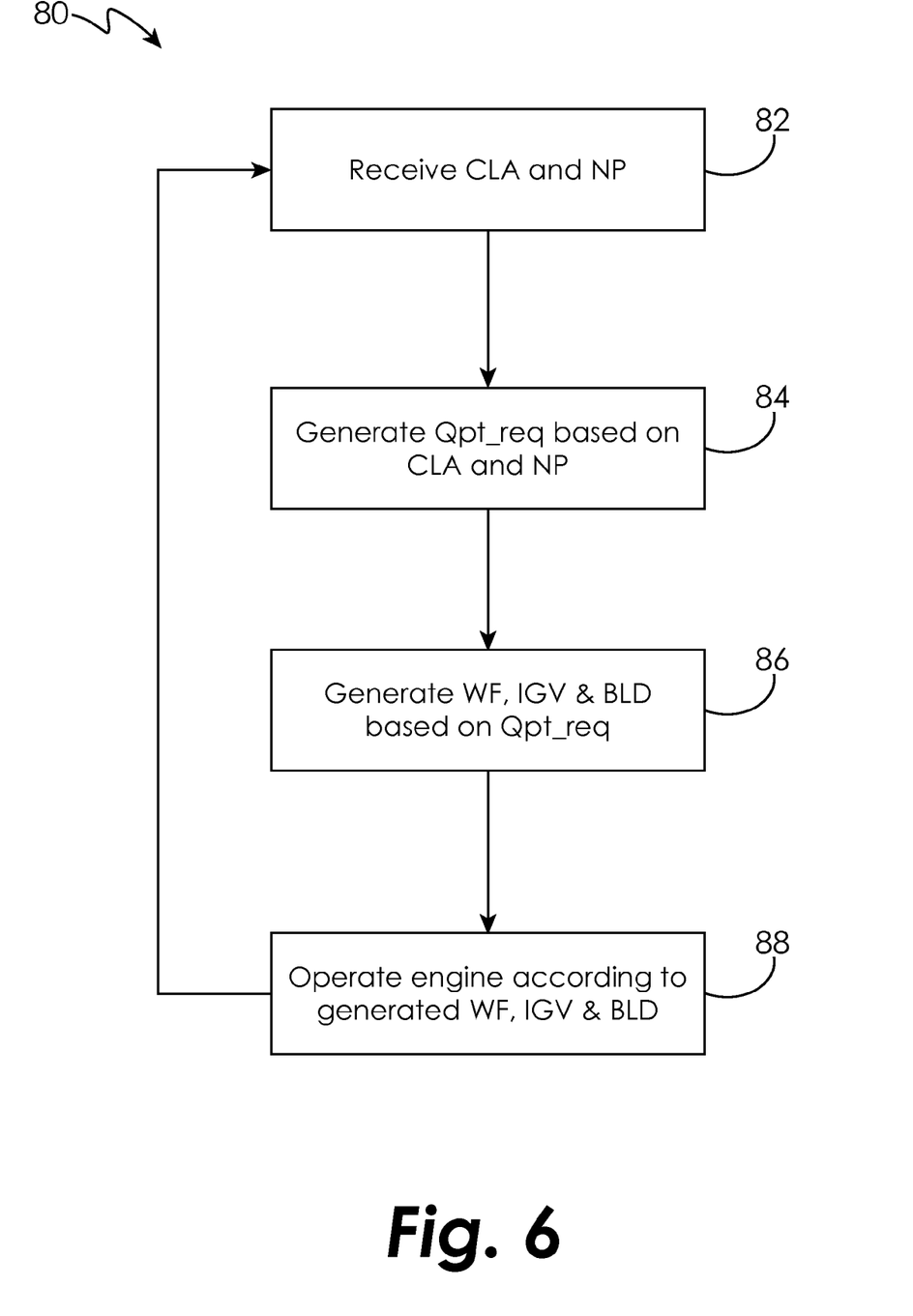
FIG. 6 is a flowchart illustrating an exemplary process for controlling a gas turbine engine, according to another embodiment.

Turning now to FIG. 6, with continued reference to FIGS. 1-5, an exemplary process 80 for controlling the gas turbine engine 20. At block 82, the control system 60 may receive the real-time collective lever angle command (CLA) and the real-time power turbine speed (NP) signal. The outer loop control module 62 of the control system 60 generates the torque request (Qpt_req) based at least in part on the real-time collective lever angle (CLA) command and the real-time power turbine speed (NP) signal, at block 84. At block 86, the inner loop control module 64 of the control system 60 generates the fuel flow (WF), the inlet guide vane (IGV), and the stability bleed (BLD) signals based at least in part on the generated torque request (Qpt_req) by the outer loop control module 62. The gas turbine engine 20 is operated according to the generated fuel flow (WF), inlet guide vane (IGV), and stability bleed (BLD) signals. More specifically, the inner loop control module 64 sends the fuel flow, inlet guide vane, and stability bleed signals to the gas generator section 22 of the gas turbine engine 20 in order to control the torque output of the power turbine section 24.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, on rotorcraft for generating output shaft power, or in land, marine, or aircraft applications for generating power.

The described disclosure provides a cascaded architecture of a multi-variable control system for a gas turbine engine (e.g., turboshaft engine). The disclosed control system and method allow for the gas turbine engine to promptly deliver a requested change in power demand during flight maneuvers, while at the same time, minimizing power turbine speed excursion caused by a rotor load at various power levels. The disclosed system and method coordinate multi-variable controls, i.e., fuel flow and ingle guide vane schedules, in order to meet the power demand under engine operation limits.

The cascaded architecture of the disclosed control system includes an outer loop control module for power turbine control and an inner loop control module for gas generator control. Based on a collective lever angle command from a pilot of the aircraft, the outer loop control module utilizes feed-forward load anticipation and Proportional-Integral control to calculate a power turbine torque request, thereby minimizing the power turbine speed excursion. Any potential wind-up of the integrator is resolved through a hybrid control logic. In order to minimize error between the calculated power turbine torque request and an estimated real-time power turbine torque, the inner loop control module utilizes a real-time implementation of a dynamic model and a constrained dynamic inversion control approach for the gas generator to regulate both fuel flow and inlet guide vanes of the gas turbine engine.

By using the control system and method disclosed herein, rotor speed excursion is reduced during quick changes in load or power demand, thereby providing improved flight handling quality at various power levels. In addition, more consistent compressor stall/surge protection is provided due to the limits or constraints incorporated into the inner loop control module. Furthermore, as applied to a turboshaft engine, the multi-variable control system with cascaded architecture affords smoother transients between autorotation and recovery. Moreover, the disclosed system and method provides improved integration with different airframes in load changes.

While the presently disclosed embodiments have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A control system for a gas turbine engine including a power turbine, the control system comprising:
   an outer loop control module configured to output a current power turbine torque request (Qpt_req), the outer loop control module comprising:
      a feedback control component configured to provide regulation of the power turbine;
      a feed-forward component configured to anticipate a load on the power turbine; and
      a hybrid control component configured to cause the feedback control component to switch to a decay dynamic if a previously determined power turbine torque request (Qpt_req) deviates more than a predetermined amount from a currently delivered torque of the power turbine; and
   an inner loop control module configured to receive the current power turbine torque request (Qpt_req) from the outer loop control module, to determine fuel flow and inlet guide vane schedules based at least in part on the received current power turbine torque request (Qpt_req), and to send signals to a gas generator of the gas turbine engine in order to control the gas generator according to the determined fuel flow and inlet guide vane schedules.

2. The control system of claim 1, wherein the outer loop control module determines the current power turbine torque request (Qpt_req) based at least in part on a real-time collective lever angle command.

3. The control system of claim 1, wherein the load is produced by a rotor coupled to the power turbine.

4. The control system of claim 3, wherein the feed-forward component includes predetermined rotor load maps for an airframe containing the power turbine and the rotor.

5. The control system of claim 1, wherein the feedback control component comprises a Proportional Integral control component.

6. The control system of claim 5, wherein the Proportional Integral control component includes an integrator operative to produce an integral control signal (U_int).

7. The control system of claim 6, wherein the hybrid control component is configured to cause the integrator to switch to the decay dynamic if the previously determined power turbine torque request (Qpt_req) deviates more than a predetermined amount from the currently delivered torque of the power turbine.

8. The control system of claim 7, wherein the hybrid control component receives the integral control signal (U_int), a power turbine torque error signal (Qpt_error) comprising the previously determined power turbine torque request (Qpt_req) minus one of a measured or estimated value of the currently delivered torque of the power turbine, and a power turbine speed error signal (NP_error) comprising a desired power turbine speed minus a measured speed of the power turbine, wherein the hybrid control component is configured to cause the integrator to converge to zero if either of the following conditions are present during a period of time:
   (A) U_int is greater than zero
      and either:
         1) the previously determined Qpt_req is greater than a predetermined maximum limit; or
         2) NP_error is greater than a first predetermined positive threshold value and
            Qpt_error is greater than a second predetermined positive threshold value.
   (B) U_int is less than zero
      and either:
         1) the previously determined Qpt_req is less than a predetermined minimum limit; or
         2) NP_error is less than a first predetermined negative threshold value and
            Qpt_error is less than a second predetermined negative threshold value.

9. The control system of claim 1, further comprising a load estimation module configured to communicate with the outer loop control module, the inner loop control module, and the gas turbine engine, the load estimation module configured to generate signals indicative of a real-time estimated power turbine speed and a real-time estimated power turbine torque.

10. The control system of claim 1, wherein the inner loop control module determines the fuel flow and inlet guide vane schedules based at least in part on a real-time estimated power turbine speed.

11. A turboshaft engine, comprising:
a gas generator section;
a power turbine section downstream of the gas generator section; and
a control system in communication with the gas generator section and the power turbine section, the control system comprising:
an outer loop control module configured to output a current power turbine torque request (Qpt_req), the outer loop control module comprising:
a feedback control component configured to provide regulation of the power turbine;
a feed-forward component configured to anticipate a load on the power turbine; and
a hybrid control component configured to cause the feedback control component to switch to a decay dynamic if a previously determined power turbine torque request (Qpt_req) deviates more than a predetermined amount from a currently delivered torque of the power turbine; and
an inner loop control module configured to receive the current power turbine torque request (Qpt_req) from the outer loop control module, to determine fuel flow and inlet guide vane schedules based at least in part on the received current power turbine torque request (Qpt_req), and to send signals to a gas generator of the gas turbine engine in order to control the gas generator according to the determined fuel flow and inlet guide vane schedules.

12. The control system of claim 11, wherein the outer loop control module determines the current power turbine torque request (Qpt_req) based at least in part on a real-time collective lever angle command.

13. The control system of claim 11, wherein the load is produced by a rotor coupled to the power turbine.

14. The control system of claim 13, wherein the feed-forward component includes predetermined rotor load maps for an airframe containing the power turbine and the rotor.

15. The control system of claim 11, wherein the feedback control component comprises a Proportional Integral control component.

16. The control system of claim 15, wherein the Proportional Integral control component includes an integrator operative to produce an integral control signal (U_int).

17. The control system of claim 16, wherein the hybrid control component is configured to cause the integrator to switch to the decay dynamic if the previously determined power turbine torque request (Qpt_req) deviates more than a predetermined amount from the currently delivered torque of the power turbine.

18. The control system of claim 17, wherein the hybrid control component receives the integral control signal (U_int), a power turbine torque error signal (Qpt_error) comprising the previously determined power turbine torque request (Qpt_req) minus one of a measured or estimated value of the currently delivered torque of the power turbine, and a power turbine speed error signal (NP_error) comprising a desired power turbine speed minus a measured speed of the power turbine, wherein the hybrid control component is configured to cause the integrator to converge to zero if either of the following conditions are present during a period of time:
(A) U_int is greater than zero
and either:
1) the previously determined Qpt_req is greater than a predetermined maximum limit; or
2) NP_error is greater than a first predetermined positive threshold value and
Qpt_error is greater than a second predetermined positive threshold value.
(B) U_int is less than zero
and either:
1) the previously determined Qpt_req is less than a predetermined minimum limit; or
2) NP_error is less than a first predetermined negative threshold value and
Qpt_error is less than a second predetermined negative threshold value.

19. The control system of claim 11, further comprising a load estimation module configured to communicate with the outer loop control module, the inner loop control module, and the gas turbine engine, the load estimation module configured to generate signals indicative of a real-time estimated power turbine speed and a real-time estimated power turbine torque.

20. The control system of claim 11, wherein the inner loop control module determines the fuel flow and inlet guide vane schedules based at least in part on a real-time estimated power turbine speed.

* * * * *